United States Patent [19]

Ikuma et al.

[11] Patent Number: 4,598,126
[45] Date of Patent: * Jul. 1, 1986

[54] HEAT RESISTANT RESIN COMPOSITION

[75] Inventors: Sadao Ikuma, Suzuka; Yuji Aoki, Yockaichi; Noboru Watanabe, Matsudo, all of Japan

[73] Assignee: Mitsubishi Monsanto Chemical Co., Tokyo, Japan

[ * ] Notice: The portion of the term of this patent subsequent to Apr. 26, 2000 has been disclaimed.

[21] Appl. No.: 720,266

[22] Filed: Apr. 5, 1985

Related U.S. Application Data

[62] Division of Ser. No. 501,111, Jun. 6, 1983, Pat. No. 4,525,536.

[30] Foreign Application Priority Data

Jun. 21, 1982 [JP] Japan ................................ 57-106553

[51] Int. Cl.$^4$ ..................... C08L 25/12; C08L 33/24
[52] U.S. Cl. ................................... 525/194; 525/205; 525/207; 525/243; 525/282; 525/285; 525/379
[58] Field of Search ............... 525/194, 207, 205, 243, 525/285, 379, 282

[56] References Cited

U.S. PATENT DOCUMENTS 4,374,951  2/1983  Lee et al. ............................. 525/205
4,381,373  4/1983  Ikuma et al. ......................... 525/205

FOREIGN PATENT DOCUMENTS 2496109  6/1982  France .

Primary Examiner—Allan M. Lieberman
Attorney, Agent, or Firm—Oblon, Fisher, Spivak, McClelland & Maier

[57] ABSTRACT

A heat resistant resin composition comprising from 10 to 90% by weight of a copolymer A and from 90 to 10% by weight of a copolymer B, in which the copolymer A is composed of an N-aromatic maleimide monomer residue, a maleimide monomer residue, a vinyl aromatic monomer residue and, optionally other vinyl monomer residue, the total content of the N-aromatic maleimide monomer residue and the maleimide monomer residue being from 10 to 45%, the content of the N-aromatic maleimide monomer residue being greater than the content of the maleimide monomer residue, the content of the vinyl aromatic monomer residue being from 90 to 55% and the content of said other vinyl monomer residue being from 0 to 20%, and the copolymer B is composed of a vinyl cyanide monomer residue, a vinyl aromatic monomer residue and, optionally other vinyl monomer residue, the content of the vinyl cyanide monomer residue being from 20 to 55%, the content of the vinyl aromatic monomer residue being from 80 to 45% and the content of said other vinyl monomer residue being from 0 to 20%.

5 Claims, No Drawings

HEAT RESISTANT RESIN COMPOSITION

This is a division of application Ser. No. 501,111, filed June 6, 1983, now U.S. Pat. No. 4,525,536.

The present invention relates to a heat resistant resin composition having a high thermal deformation temperature and a high thermal decomposition temperature.

A copolymer (SMA) of a vinyl aromatic monomer with maleic anhydride has a high thermal deformation temperature and good compatibility with other thermoplastic resins such as a styreneacrylonitrile copolymer (AS resin), and it is useful for the preparation of a heat resistant resin composition.

However, SMA is inferior in its stability at a high temperature, and it has drawbacks that when heated at a temperature of 230° C. or higher, it tends to lead to foaming or weight reduction and it is likely to undergo cross-linking, whereby the molding processability of the resin composition containing SMA is considerably impaired. It has been attempted to improve the high temperature stability of SMA by incorporating various additives such as anti-oxidants, but no satisfactory results have been obtained. The present inventors have conducted extensive researches with an aim to overcome the above-mentioned drawbacks and to present a heat resistant resin composition containing a copolymer composed of a vinyl aromatic monomer and a maleic acid derivative and having a high temperature stability and a high thermal deformation temperature. As a result, the present invention has been accomplished.

Namely, the above-mentioned object of the present invention has been attained by a heat resistant resin composition comprising from 10 to 90% by weight of a copolymer A and from 90 to 10% by weight of a copolymer B, in which the copolymer A is composed of an N-aromatic maleimide monomer residue, a maleimide monomer residue, a vinyl aromatic monomer residue and, optionally other vinyl monomer residue, the total content of the N-aromatic maleimide monomer residue and the maleimide monomer residue being from 10 to 45%, the content of the N-aromatic maleimide monomer residue being greater than the content of the maleimide monomer residue, the content of the vinyl aromatic monomer residue being from 90 to 55% and the content of said other vinyl monomer residue being from 0 to 20%, and the copolymer B is composed of a vinyl cyanide monomer residue, a vinyl aromatic monomer residue and, optionally other vinyl monomer residue, the content of the vinyl cyanide monomer residue being from 20 to 55%, the content of vinyl aromatic monomer residue being from 80 to 45% and the content of said other vinyl monomer residue being from 0 to 20%.

In the present invention, the content of each monomer residue is represented by a proportion by percentage of the number of units of the monomer residue to the total number of units of various monomer residues contained in the copolymer concerned.

Now, the present invention will be described in detail with reference to the preferred embodiments.

As the vinyl aromatic compound to be used in the present invention, styrene is most common, but other compounds such as α-methylstyrene, p-methylstyrene, t-butylstyrene, a styrene halogenide or a mixture thereof may be used. As the vinyl cyanide compound, acrylonitrile, methacrylonitrile or a mixture thereof is usually used.

The N-aromatic maleimide may be obtained by condensing a primary aromatic amine with fumaric acid, maleic acid, maleic acid anhydride or other maleic acid derivatives. As the primary aromatic amine, aniline or an aniline derivative with its benzene ring substituted by an alkyl group, a halogen atom or a nitro group, such as toluidine or nitroaniline is used. Further, phenylenediamine or α-naphthylamine may also be used. These amines may be used alone or in combination as a mixture of two or more different kinds. The maleimide may be obtained by condensing a maleic acid derivative such as maleic acid anhydride, with ammonia. The copolymer A may be produced by copolymerizing an N-aromatic maleimide with other monomers. However, as will be mentioned hereinafter, it is preferred to employ a method wherein a maleic acid anhydride copolymer is reacted with the above-mentioned amine and ammonia during the polymerization step or in a separate step to convert it into an imide, since this method is simple and the required monomers are readily available.

The content of the N-aromatic maleimide in the copolymer A must be greater than the content of the maleimide. Otherwise, the compatibility of the copolymer A with the copolymer B will be poor, thus leading to an inferior physical properties of the resin composition thereby obtained. Within the above-mentioned range, the greater the content of the maleimide residue is, the higher the thermal deformation temperature becomes.

The total content of the N-aromatic maleimide residue and the maleimide residue contained in the copolymer A should be from 10 to 45%. If the total amount exceeds 45%, the flowability tends to decrease and the molding operation becomes difficult. On the other hand, if the total amount is less than 10%, no adequate improvement of the thermal deformation temperature is obtainable.

Further, the content of the vinyl aromatic monomer residue should be from 90 to 55%. If the content of the vinyl aromatic monomer residue increases, the flowability will be improved, but the thermal deformation temperature decreases.

A part of the vinyl aromatic monomer residue may be replaced by other monomer, for instance, a vinyl cyanide monomer such as acrylonitrile or methacrylonitrile, an ester of acrylic acid or methaacrylic acid such as methylacrylate or methylmethacrylate, or a derivative of maleic acid or fumaric acid such as maleic anhydride, dimethyl maleate or dimethyl fumarate, as the case requires. In such a case, the content of the other monomer for replacement should be at most 20%. If the content exceeds 20%, the compatibility with other styrene-type resin is likely to be inferior.

Adequate compatibility with the copolymer A will be obtained if the content of the vinyl cyanide monomer residue in the copolymer B is within a range of from 20 to 55%, the rest being the vinyl aromatic monomer residue.

A part of the vinyl aromatic monomer residue may preferably be substituted by other vinyl monomer such as an ester of acrylic acid or methacrylic acid, as the case requires. In such a case, the content of said other vinyl monomer residue should preferably be at most 20%, whereby no adverse effects will be imparted to the compatibility with other resins.

The composition according to the present invention is superior in the heat resistance, high temperature stability, solvent resistance and flowability during the molding operation. Further, the composition of the present invention has good compatibility with an ABS resin, a MBS resin, an AES resin, an ACS resin or an AAS resin, and accordingly it is possible to improve the shock resistance by incorporating such resins. In such a case, it is readily possible to bring the thermal deformation temperature (a Vicat softening point) to at least 115° C. Further, a reinforcing material or filler such as glass fiber, carbon fiber, talc or calcium carbonate, or other additives may be incorporated.

Now, the process of the present invention will be described. Firstly, bulk polymerization is conducted while continuously supplying maleic acid anhydride in the presence of the vinyl aromatic monomer. The amount of the maleic acid anhydride monomer to be added here is preferably from 10 to 45 molar %. The polymerization temperature is preferably from 90° to 130° C., and no polymerization initiator may be required. The conversion in this step is at least 10% by weight and can be increased as far as the stirring driving force of the polymerization apparatus permits. The polymerization time is determined depending upon the conversion, the polymerization temperature, the concentration of the maleic acid anhydride, and is usually within a range of from 1 to 10 hours. After completion of the continuous supply of the maleic acid anhydride, the maleic acid anhydride in the monomer mixture will rapidly be consumed, whereupon the system becomes in the form of a syrup composed substantially of the copolymer and the vinyl aromatic monomer. A part of the vinyl aromatic compound to be initially present may be replaced by an ester of acrylic acid, an ester of methacrylic acid or a vinyl cyanide compound.

To this syrup, a vinyl cyanide monomer is added and uniformly mixed. The amount of the addition is adjusted to bring the content of the vinyl cyanide monomer residue in the copolymer formed by the reaction with the remaining vinyl aromatic compound to a level of from 20 to 55%.

This syrup is suspended in water, and the vinyl aromatic monomer and the vinyl cyanide monomer are co-polymerized by suspension polymerization. A conventional polymerization initiator such as azobisisobutyronitrile or benzoyl peroxide may be used. Likewise, the suspension agent may be a conventional one such as polyvinyl alcohol, polyacrylamide or barium sulfate. The polymerization temperature is usually within a range of from 60° to 160° C., and the polymerization time is determined depending upon the polymerization temperature and the type and amount of the initiator, but, is usually within a range of from 1 to 10 hours. In order to maintain the content of the vinyl cyanide monomer residue in the resulting copolymer to be constant, the vinyl aromatic monomer or the vinyl cyanide monomer may be added continuously or intermittently. Further, in order to reduce the amount of the resulting copolymer or to reduce the monomers remaining in the copolymer, stripping may be conducted to recover the monomers.

Then, to this suspension system, an aromatic amine and ammonia are added to convert the maleic anhydride residue of the copolymer to its imide. The total moles of the aromatic amine and ammonia to be added are preferably from 0.8 to 1.5 times the moles of the maleic anhydride used. The moles of the aromatic amine are required to be greater than the moles of the ammonia. If the moles of the added amine exceeds 1.5 times, unreacted amine will remain in the composition thus obtained, and if it is less than 0.8 time, the conversion to imide will be inadequate, such being undesirable. The reaction temperature for the conversion to imide is preparably from 120° to 160° C., and the reaction time is preferably from 0.5 to 3 hours. The ammonia may be added in the form of a gas or an aqueous solution (i.e. aqueous ammonia).

Thus, a heat resistant resin composition in the form of particles (beads) wherein the copolymer A and the copolymer B are uniformly mixed, is obtainable. According to the process of the present invention, it is unnecessary to use the N-aromatic maleimide and maleimide which are expensive and which are not prepared by mass-production, and it is unnecessary to mechanically kneading the copolymer A and the copolymer B since the product is obtainable in the form wherein such copolymers are already uniformly mixed. Thus, industrial merit of this process is extremely great.

Now, the present invention will be described in further detail with reference to Examples. Various physical properties of the compositions were measured in accordance with the following methods.

Tensile strength and Izod impact strength: JIS K-6871
Heat resistance (Vicat softening point): JIS K-6870
High temperature stability: A test piece was maintained in a gear oven at 270° C. for 1 hour, whereupon the presence or absence of foaming and the weight reduction were measured.

EXAMPLE 1

Into a 20 l autoclave, 5710 g of styrene and 189 g of maleic anhydride were fed, and the temperature was raised to 110° C. under stirring in a nitrogen atmosphere. While continuously adding to this system liquid maleic anhydride in a total amount of 1143 g maintained at a temperature of 70° C. at a supply rate as shown in the following Table 1, bulk polymerization was conducted at 110° C. for 220 minutes. At the completion of the continuous addition, the conversion was 55% by weight and the content of the maleic anhydride residue in the resulting copolymer was 33%. To this system, 1200 g of acrylonitrile was added in 20 minutes, while lowering the temperature of the system to 95° C., and the stirring was continued for further 10 minutes at this temperature. At this stage, the concentration of the maleic anhydride in the monomers was not more than 0.1%.

To this system, 3 g of a polyvinyl alcohol-type suspension agent, 3 g of a polyacrylic acid ester-type suspension agent and 6500 g of water containing 30 g of sodium sulfate were added to bring the system in a suspension state. To this suspension, 4 g of azobisisobutyronitrile was added, and polymerization was conducted at 80° C. for 90 minutes. The temperature was raised to 150° C. in 60 minutes, and stripping was conducted for 60 minutes at this temperature. Then, 1140 g of aniline and 116 1 g of 30% aqueous ammonia were added thereto, and the reaction for the conversion to imide was conducted at a temperature of 155° C. for 120 minutes. The obtained polymer in the form of beads was washed with water and then dried.

The beads were analyzed and found to be a mixture comprising 58% by weight of a copolymer A composed of 30% of the N-phenylmaleimide residue, 3% of the maleimide residue and 67% of the styrene residue, and 42% by weight of a copolymer B composed of 40% of the acrylonitrile residue and 60% of the styrene residue.

The beads were pelletized by a 1 inch extruder equipped with a vent, and then formed into test pieces by a 1 ounce injection molding machine. Various physical properties of the test pieces were evaluated, and the results are shown in Table 2.

TABLE I

| | Supply rate of maleic anhydride | |
|---|---|---|
| Time (min.) | Supply rate (g/min.) | Total amount (g) |
| 0 | 7.0 | 0 |
| 60 | 5.9 | 388 |
| 120 | 5.0 | 715 |
| 180 | 4.2 | 992 |
| 220 | 3.8 | 1,143 |

EXAMPLE 2

Beads were prepared in the same manner as in Example 1 except that the amount of aniline was changed to 885 g and the amount of 30% aqueous ammonia was changed to 270 g.

The composition of the beads was found to be a mixture comprising 57% by weight of a copolymer A composed of 23% of the N-phenylmaleimide residue, 10% of the maleimide residue and 67% of the styrene residue, and 43% by weight of a copolymer B composed of 40% of the acrylonitrile residue and 60% of the styrene residue. The physical properties are shown in Table 2.

EXAMPLE 3

64 parts by weight of the pellets of Example 2 were mixed with 36 parts by weight of an ABS resin (styrene residue: 49% by weight, acrylonitrile residue: 17% by weight, and butadiene residue: 34% by weight) prepared by emulsion polymerization, and the mixture was pelletized and formed into test pieces. Various physical properties of the test pieces were evaluated. The results thereby obtained are shown in Table 2.

COMPARATIVE EXAMPLE 1

Beads were prepared in the same manner as in Example 1 except that no aniline and no ammonia were added.

The composition of the beads was found to be a mixture comprising 53% by weight of SMA composed of 33% of the maleic anhydride residue and 67% of the styrene residue, and 47% by weight of a copolymer B composed of 40% of the acrylonitrile residue and 60% of the styrene residue. The physical properties are shown in Table 2.

COMPARATIVE EXAMPLE 2

Beads were prepared in the same manner as in Example 1 except that the amount of aniline was changed to 506 g, and the amount of 30% aqueous ammonia was changed to 500 g.

The composition of the beads was found to be a mixture comprising 55% by weight of a copolymer composed of 13% of the N-phenylmaleimide residue, 20% of the maleimide residue and 67% of the styrene residue, and 45% by weight of a copolymer B composed of 40% of the acrylonitrile residue and 60% of the styrene residue. The physical properties are shown in Table 2. While the test pieces of Examples 1 and 2 were transparent, the test pieces of this Comparative Example were opaque, thus indicating that the compatibility of the copolymers A and B was lost.

COMPARATIVE EXAMPLE 3

Various properties of the commercially available AS resin (SAN-C manufactured by Mitsubishi Monsanto Chemical Company) were evaluated, and the results are shown in Table 2.

COMPARATIVE EXAMPLE 4

46 parts by weight of the AS resin used in Comparative Example 3 was mixed with 36 parts by weight of the ABS resin used in Example 3, and the mixture was pelletized and then formed into test pieces. Various physical properties of the test pieces were evaluated. The results thereby obtained are shown in Table 2.

COMPARATIVE EXAMPLE 5

A composition was obtained in the same manner as in Example 1 except that the amount of aniline was changed to 1260 g, and the amount of 30% aqueous ammonia was changed to 0.

This composition was found to be a mixture comprising 58% by weight of a copolymer composed of 31% of the N-phenylmaleimide residue, 2% of the maleic anhydride residue and 67% of the styrene residue and 42% by weight of a copolymer composed of 40% of the acrylonitrile residue and 60% of the styrene residue. The physical properties of the test pieces of this Comparative Example are shown in Table 2. In the case where no maleimide residue was present, the Vicat softening point decreased by about 10° C. as compared with the case where the maleimide residue is present.

COMPARATIVE EXAMPLE 6

A composition was obtained in the same manner as in Example 1 except that the amount of aniline was changed to 0 and the amount of 30% aqueous ammonia was changed to 770 g.

This composition was found to be a mixture comprising of 53% by weight of a copolymer A composed of 29% of the maleimide residue, 4% of the maleic anhydride residue and 67% of the styrene residue, and 47% by weight of a copolymer B composed of 40% of the acrylonitrile residue and 60% of the styrene residue.

The test pieces containing no N-phenylmaleimide residue was opaque and brittle, and the compatibility of the copolymers A and B was thereby completely lost.

TABLE 2

| | Examples | | | Comparative Examples | | | | |
|---|---|---|---|---|---|---|---|---|
| | 1 | 2 | 3 | 1 | 2 | 3 | 4 | 5 |
| Tensile strength (Kg/cm$^2$) | 680 | 680 | 500 | 670 | 610 | 720 | 470 | 700 |
| Izod impact strength (Kg cm/cm) | 1.4 | 1.4 | 14.0 | 1.3 | 0.9 | 1.8 | 15.0 | 1.5 |
| Vicat softening point (°C.) | 133 | 137 | 123 | 131 | 136 | 100 | 98 | 125 |
| High temperature stability | | | | | | | | |
| Foaming | No | No | No | Yes | No | No | No | No |
| Weight reduction (wt. %) | 0.9 | 0.9 | 1.0 | 3.8 | 0.9 | 0.9 | 1.0 | 1.0 |

We claim:
1. A process for preparing a heat resistant resin composition which comprises bulk-polymerising a vinyl aromatic monomer with from 10 to 45 molar % of a maleic acid anhydride monomer to obtain a syrup composed substantially of a first copolymer and an unreacted vinyl aromatic monomer, adding a vinyl cyanide monomer to this syrup in such an amount that the content of the vinyle cyanide monomer residue in a second copolymer to be formed by its reaction with the unreacted vinyl aromatic monomer becomes from 20 to 55%, subjecting the mixture to suspension polymerization to polymerize the unreacted vinyl aromatic monomer with the vinyl cyanide monomer to form the second copolymer, then adding an aromatic amine and ammonia to the suspension system in a total amount by mole of from 0.8 to 1.5 times the amount by mole of the maleic acid anhydride to convert the maleic acid anhydride residue in the first copolymer to its imide.

2. The process according to claim 1 wherein the amount by mole of the aromatic amine is greater than the amount by mole of the ammonia.

3. The process according to claim 1 wherein the bulk-polymerization is conducted at a temperature of from 90° to 130° C. for from 1 to 10 hours.

4. The process according to claim 1 wherein the suspension polymerization is conducted at a temperature of from 60° to 160° C. for from 1 to 10 hours.

5. The process according to claim 1 wherein the reaction to convert the maleic anhydride residue to its imide is conducted at a temperature of from 120° to 160° C. for from 0.5 to 3 hours.

* * * * *